(12) United States Patent
Thorn

(10) Patent No.: US 8,091,820 B2
(45) Date of Patent: Jan. 10, 2012

(54) CABLE COILING APPARATUS

(76) Inventor: John P. Thorn, Victor, ID (US)

( * ) Notice: Subject to any disclaimer, the term of this patent is extended or adjusted under 35 U.S.C. 154(b) by 260 days.

(21) Appl. No.: 12/605,098

(22) Filed: Oct. 23, 2009

(65) Prior Publication Data

US 2011/0095119 A1    Apr. 28, 2011

(51) Int. Cl.
*B65H 75/38* (2006.01)
(52) U.S. Cl. .................. 242/388.1; 242/405; 242/405.1
(58) Field of Classification Search ............... 242/388.1, 242/404, 601, 129, 614, 405, 405.1
See application file for complete search history.

(56) References Cited

U.S. PATENT DOCUMENTS

| | | | |
|---|---|---|---|
| 2,319,731 A * | 5/1943 | Garrett | 242/388 |
| 2,846,162 A | 8/1958 | Allin, Sr. et al. | |
| 3,202,372 A | 8/1965 | Meline et al. | |
| 3,743,210 A | 7/1973 | Hawley | |
| 3,791,606 A | 2/1974 | Brown | |
| 3,853,285 A | 12/1974 | Woodring | |
| 4,066,224 A | 1/1978 | Hargreaves et al. | |
| 4,253,570 A | 3/1981 | O'Connor et al. | |
| 4,387,863 A | 6/1983 | Edmonston et al. | |
| 4,530,471 A | 7/1985 | Inoue | |
| 4,588,142 A | 5/1986 | Malzacher | |
| 4,602,751 A | 7/1986 | Vogel | |
| 4,657,140 A | 4/1987 | Zagar et al. | |
| 4,657,203 A | 4/1987 | Crawford | |
| 4,734,092 A * | 3/1988 | Millerd | 604/67 |
| 4,802,638 A * | 2/1989 | Burger et al. | 242/388.1 |
| 5,013,121 A | 5/1991 | Anton et al. | |
| 5,069,523 A | 12/1991 | Finzel et al. | |
| 5,230,480 A * | 7/1993 | Perry | 242/386 |
| 5,246,184 A | 9/1993 | Trewhella, Jr. | |
| 5,332,171 A | 7/1994 | Steff | |
| 5,372,225 A | 12/1994 | Joynes et al. | |
| 5,441,215 A | 8/1995 | Nagayama et al. | |
| 5,489,010 A | 2/1996 | Rogers | |
| 5,551,647 A | 9/1996 | Browning | |
| 5,559,922 A | 9/1996 | Arnett | |
| 5,588,626 A | 12/1996 | Yang | |
| 5,732,898 A | 3/1998 | Odessky et al. | |
| 5,762,281 A | 6/1998 | Foley | |
| 5,802,237 A | 9/1998 | Pulido | |
| 5,871,171 A | 2/1999 | Kenney et al. | |
| 5,890,674 A | 4/1999 | Major | |

(Continued)

OTHER PUBLICATIONS

"Cable Capture" brochure from www.cablecapture.com available upon information and belief at least as early as Oct. 23, 2009.

(Continued)

*Primary Examiner* — Sang Kim
(74) *Attorney, Agent, or Firm* — Workman Nydegger

(57) ABSTRACT

A cable coiling apparatus includes a main body and a resilient cover. The main body has a base and a top cap with a central post extending therebetween. The cover has a top surface and an opposing bottom surface with an outer lip formed along a perimeter outer edge and an inner lip projecting from an inner edge, the inner lip being received within a channel of the top cap so as to secure the cover to the top cap. The cover is movable between a first position in which the cover has a substantially concave shape so that the outer lip presses against the base, and a second position in which the cover has a substantially convex shape so that the central post is freely exposed.

15 Claims, 6 Drawing Sheets

U.S. PATENT DOCUMENTS

| | | | |
|---|---|---|---|
| 5,915,640 A * | 6/1999 | Wagter et al. | 242/388.1 |
| 5,941,396 A | 8/1999 | Le Vert | |
| 5,967,454 A | 10/1999 | Yarnell et al. | |
| 5,971,316 A | 10/1999 | Kim | |
| 5,971,317 A | 10/1999 | Jaros | |
| 5,984,224 A | 11/1999 | Yang | |
| 6,065,708 A | 5/2000 | Matsubara | |
| 6,065,709 A | 5/2000 | Wagter et al. | |
| 6,079,657 A | 6/2000 | Hwang | |
| 6,164,582 A * | 12/2000 | Vara | 242/395 |
| 6,243,526 B1 | 6/2001 | Garibay et al. | |
| 6,254,025 B1 | 7/2001 | Liao | |
| 6,378,797 B1 | 4/2002 | Liao | |
| 6,398,149 B1 | 6/2002 | Hines et al. | |
| 6,439,490 B1 | 8/2002 | Hwang | |
| 6,446,898 B1 | 9/2002 | Hwang | |
| 6,474,585 B2 | 11/2002 | Liao | |
| 6,511,009 B1 | 1/2003 | Harrison et al. | |
| 6,517,022 B1 | 2/2003 | Bailey | |
| 6,533,206 B2 | 3/2003 | Ichinari et al. | |
| 6,554,218 B2 * | 4/2003 | Buyce et al. | 242/388.6 |
| 6,600,479 B1 | 7/2003 | Smith et al. | |
| 6,612,515 B1 | 9/2003 | Tinucci et al. | |
| 6,625,374 B2 | 9/2003 | Holman et al. | |
| 6,643,443 B2 | 11/2003 | Holman et al. | |
| 6,883,744 B2 | 4/2005 | Couchey et al. | |
| 7,032,854 B2 * | 4/2006 | Marsden | 242/388.1 |
| 7,077,693 B1 * | 7/2006 | Symons | 439/501 |
| 7,120,349 B2 | 10/2006 | Elliott | |
| 7,303,162 B2 * | 12/2007 | Burke et al. | 242/405.2 |
| 7,491,903 B2 | 2/2009 | Hybiske et al. | |
| 7,543,772 B2 * | 6/2009 | Kimura | 242/322 |
| 7,654,484 B2 * | 2/2010 | Mogensen et al. | 242/402 |
| 7,888,608 B2 | 2/2011 | Hybiske et al. | |
| 7,985,199 B2 * | 7/2011 | Kornerup et al. | 604/93.01 |
| 2002/0145073 A1 * | 10/2002 | Swanson et al. | 242/588.3 |
| 2003/0038209 A1 * | 2/2003 | Remeczky | 242/610.6 |
| 2006/0186255 A1 | 8/2006 | Rooker | |
| 2006/0210230 A1 | 9/2006 | Kline et al. | |
| 2008/0203240 A1 | 8/2008 | Smrha et al. | |

OTHER PUBLICATIONS

Pages from www.cableorganizer.com available upon information and belief at least as early as Apr. 21, 2009.

Pages from www.amazon.com available upon information and belief at least as early as Apr. 21, 2009.

* cited by examiner

CABLE COILING APPARATUS

CROSS-REFERENCE TO RELATED APPLICATIONS

Not Applicable.

BACKGROUND OF THE INVENTION

1. The Field of the Invention

The present invention relates to the coiling of electrical cables and wires during use and/or storage of the cables or wires.

2. The Relevant Technology

In today's world, electrical cables and wires are ubiquitous. From computers with various components to multi-component home entertainment systems to earphones or ear buds, cables and cords extend to and from many electrical devices, often tangling with each other and being very unsightly. This can lead to fire hazards, data loss problems, or physical hazards, such as the possibility of tripping over the cables.

Furthermore, when connecting cables, such as USB cables, speaker wires, electrical extension chords, and the like are stored and/or transported, the cables can tangle or catch on other devices.

In many instances, users of the various cables have resorted to using twist-ties or rubber bands to tie each cable in a bundle. While this helps, the many cables can still be unsightly and/or catch on other devices, and cause many of the problems listed above.

BRIEF DESCRIPTION OF THE DRAWINGS

Various embodiments of the present invention will now be discussed with reference to the appended drawings. It is appreciated that these drawings depict only typical embodiments of the invention and are therefore not to be considered limiting of its scope.

DETAILED DESCRIPTION OF THE PREFERRED EMBODIMENTS

As used in the specification and appended claims, directional terms, such as "up," "down," "left," "right," "upward," "downward," and the like are used herein solely to indicate relative directions in viewing the drawings and are not intended to limit the scope of the claims in any way. In addition, the use of the terms "cable" or "cord" and their derivatives in the specification and the accompanying claims are intended to be used broadly in incorporate electrical and other cables, wires, cords and the like that may or may not have connectors or other devices disposed on the ends thereof.

Figure 1:
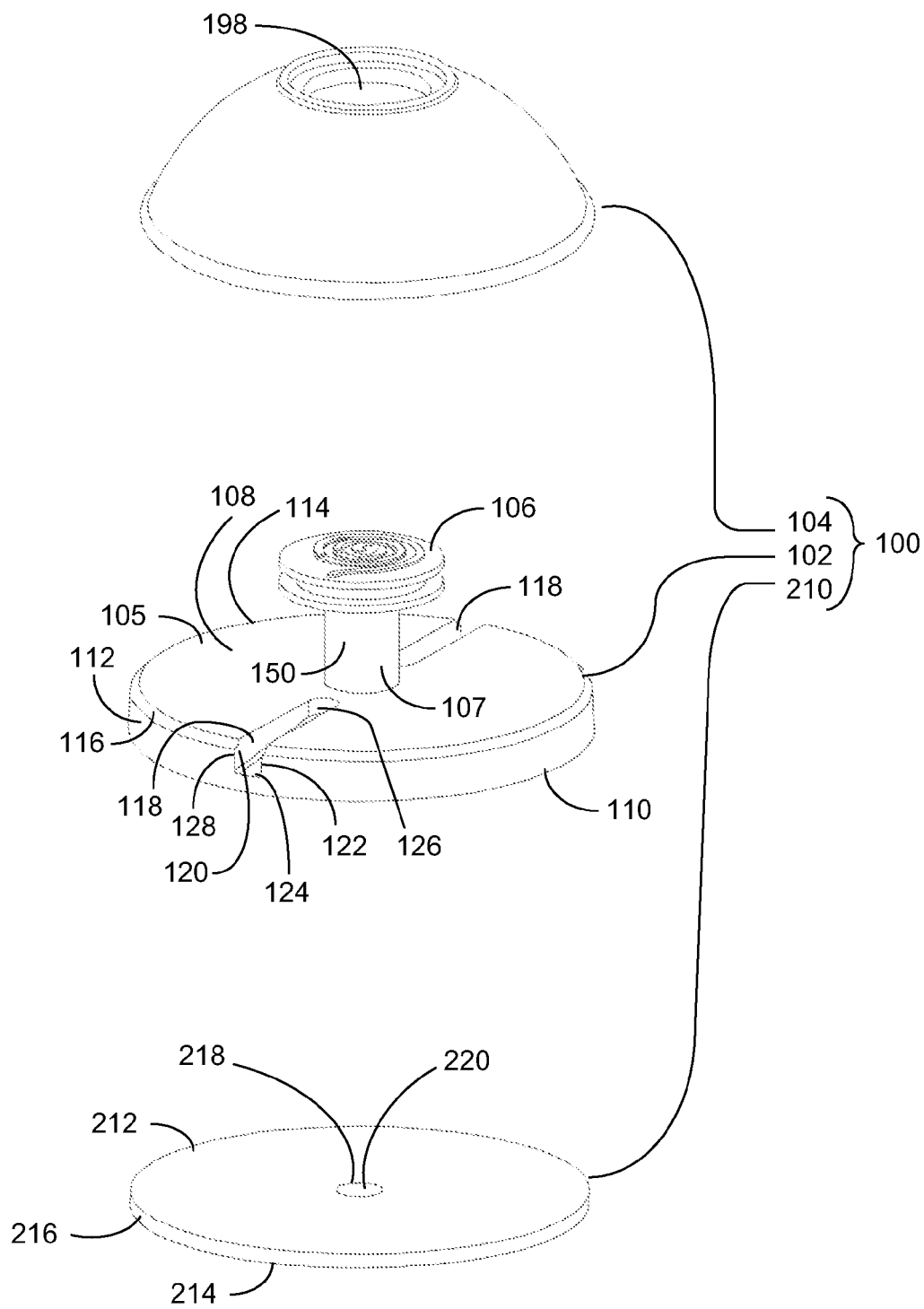
FIG. 1 is an exploded top perspective view of one embodiment of a cable coiling apparatus according to the present invention.

Depicted in FIG. 1 is one embodiment of an inventive cable coiling apparatus 100 incorporating features of the present invention. As shown in FIG. 1, apparatus 100 comprises a main body 102 with a resilient cover 104 mounted thereon.

Main body 102 comprises a base 105, a top cap 106, and a central post 107 extending therebetween. Base 105 has a top surface 108 and an opposing bottom surface 110, with a perimeter side wall 112 extending therebetween. The top surface 108 is substantially circular in shape and bounded by a perimeter edge 114. Top surface 108 can alternatively be substantially square, rectangular, oval, or other desired shape. A groove 116 is formed at perimeter edge 114, where top surface 108 and perimeter side wall 112 meet. Groove 116 can be set at a constant angle, such as a chamfer or bevel, or can be substantially curved, as in the depicted embodiment (see also FIG. 3). Other shapes are also possible. In some embodiments, groove 116 is omitted.

One or more channels 118 are also formed on top surface 110. Each channel 118 is bounded by a pair of sidewalls 120 and 122 that extend from top surface 108 to a floor 124 recessed therein. The sidewalls 120, 122 and the floor 124 also extend radially outward from an end wall 126 disposed on top surface 108 to a mouth 128 formed on the perimeter side wall 112. As such, each channel 118 is openly exposed at perimeter side wall 112. That is, there is no end wall for channel 118 at perimeter side wall 112. In one embodiment, the floor 124 extends through the perimeter side wall 112 such that mouth 128 does not extend to or below the bottom surface 110 of base 105.

Although sidewalls 120 and 122 are depicted as forming generally right angles with floor 124 so that each channel 118 has a substantially squared off cross-section, it is appreciated that sidewalls 120 and 122 can alternatively form other angles with floor 124. In one embodiment, sidewalls 120 and 122 and floor 124 are shaped so that channel 118 has a substantially rounded cross-section. Each channel 118 is sized so as to allow a cable to be positioned therein with one end projecting from the mouth 128 of the channel. Other shapes are also possible.

Figure 2:
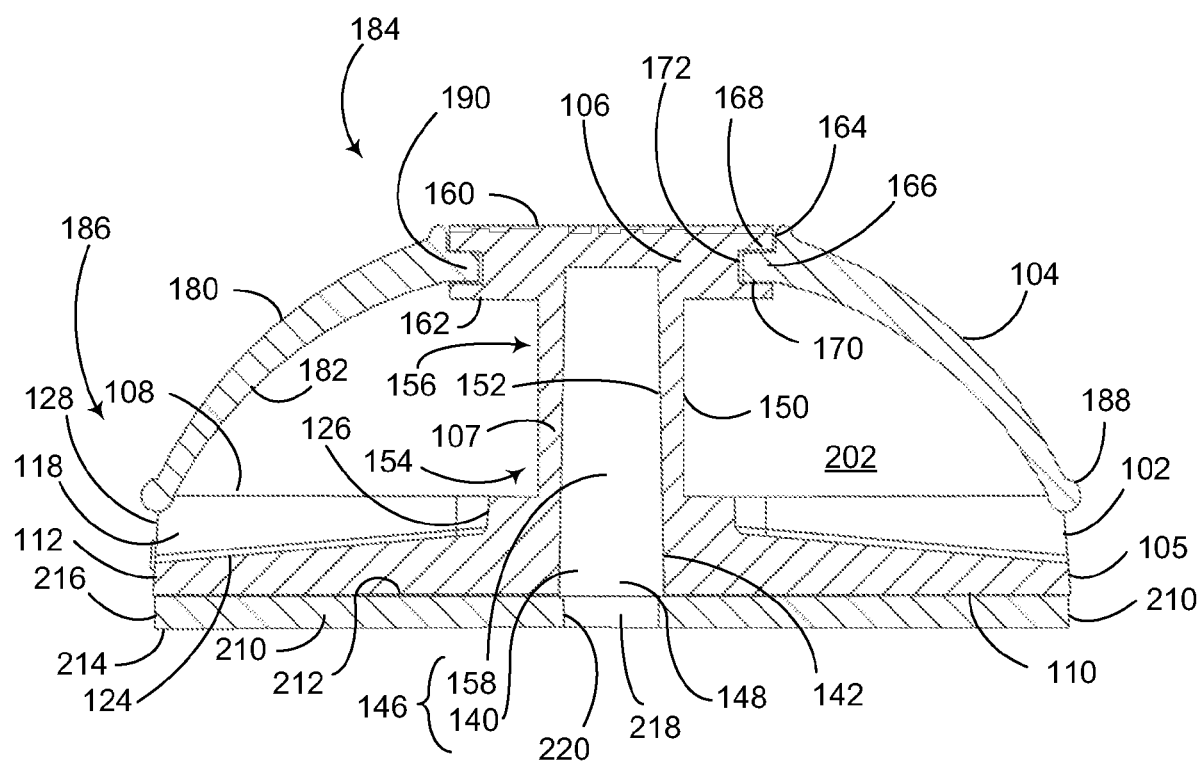
FIG. 2 is a cross-sectional side view of the cable coiling apparatus shown in FIG. 1 with the cover in the closed position.

Turning to FIG. 2 in conjunction with FIG. 1, floor 124 of channel 118 slopes generally downward as it extends from the end wall 126 to perimeter side wall 112, although this is not required. Furthermore, in some embodiments, floor 124 extends all the way to top surface 108 of base 105, eliminating end wall 126.

Returning to FIG. 1, two channels 118 are shown in the depicted embodiment, radially extending outward from the center of the top surface 108 in directions opposite of each other. As a result, the corresponding mouths 128 of channels 118 are diametrically disposed on opposite sides of perimeter side wall 112. Other relative positions of channels 118 with respect to each other are also possible. For example, channels 118 can alternatively be positioned on top surface 108 so that mouths 128 are not on opposite sides of perimeter side wall 112. In one embodiment, mouths 128 are adjacent to each other. Also, although two channels 118 are shown, it is appreciated that only one channel 118 or more than two channels 118 can alternatively be used. In some embodiments, channels 118 are omitted completely.

Bottom surface 110 of base 105 can be a solid surface, similar to top surface 108, or can comprise the bottom surfaces of a plurality of elements. For example, in the embodiment depicted in FIG. 4, a plurality of ribs 130 radially extend out from a central hub 132 to perimeter side wall 112. Each rib 130 has a bottom edge surface 134 facing away from base 105. Likewise, hub 132 and perimeter side wall 112 respectfully have bottom edge surfaces 136 and 138. Each of bottom edge surfaces 134, 136, and 138 are configured to rest on a flat surface. As such, the bottom edge surfaces 134, 136, and 138 collectively combine to form the bottom surface 108 of base 105.

Figure 4:
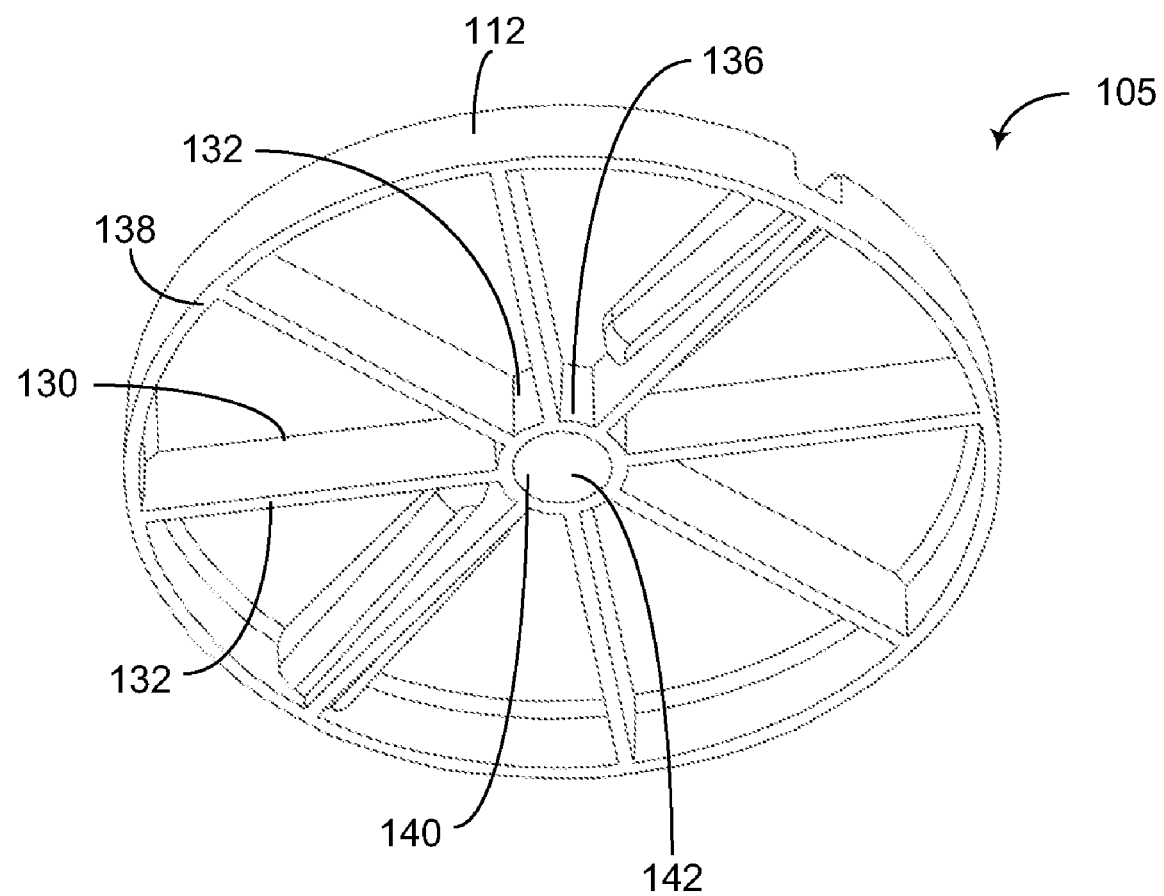
FIG. 4 is a bottom perspective view of the base of the cable coiling apparatus shown in FIG. 1.

Returning to FIG. 2 in conjunction with FIG. 4, base 105 also has an aperture 140 formed therein that extends completely through base 105 between top surface 108 and bottom surface 110. In the depicted embodiment, hub 132 includes an inner side surface 142 that bounds aperture 140. Aperture 140 is sized so as to be able to receive a mounting post, as discussed in more detail below.

Central post 107 is a generally cylindrical member that extends upward from the top surface 108 of base 105. Turning to FIG. 2 in conjunction with FIG. 1, central post 107 comprises an encircling outer side surface 150 and an opposing inner side surface 152 that extend from a first end 154 disposed on top surface 108 of base 105 to a second end 156. Inner side surface 152 bounds a bore 158 that extends through central post 107. Bore 158 is sized so as to have a diameter that is substantially the same as the diameter of aperture 140 of base 105. Central post 107 is centrally disposed on top surface 108 such that bore 158 is aligned with aperture 140. Together, aperture 140 and bore 158 combine to form a mounting passageway 146 having a mouth 148 disposed at the opening thereof.

Central post 107 can be attached to base 105 using a threaded connection, adhesive, or other attachment means known in the art. Alternatively, as shown in FIG. 2, central post 107 can be integrally molded with base 105 so as to be integrally formed as a single unitary member of the same piece of material. Although central post 107 is depicted as having a substantially circular cross section, this is not required. For example, central post can have a square, rectangular, oval, polygonal or other non circular cross section.

Disposed at second end 156 of central post 107, top cap 106 is generally parallel to top surface 108 of base 105. Top cap 106 comprises a top surface 160 and an opposing bottom surface 162 with a perimeter sidewall 164 extending therebetween. In some embodiments, the diameter of top cap 106 is equal to or smaller than the diameter of central post 107. In those cases, bottom surface 162 is omitted.

A channel 166 is formed on sidewall 164. Channel 166 can extend all the way around the perimeter of top cap 106 or any smaller portion thereof. In some embodiments, channel 166 can comprise a plurality of channels spaced apart from each other along the perimeter sidewall 164.

Channel 166 is bounded by a pair of side surfaces 168 and 170 that extend from sidewall 164 to a floor 172 recessed within sidewall 164. Although side surfaces 168 and 170 are depicted as forming generally right angles with floor 172 so that channel 166 has a substantially squared off cross-section, it is appreciated that side surfaces 168 and 170 can alternatively form other angles with floor 172. In one embodiment, side surfaces 168 and 170 and floor 172 are shaped so that channel 166 has a substantially rounded cross-section. Other shapes are also possible.

As shown in FIG. 1, top cap 106 is generally circularly shaped, although this is not required. Other shapes may alternatively be used. For example, top cap 106 can alternatively be substantially square, rectangular, oval, or other desired shape.

Top cap 106 can be attached to central post 107 using a threaded connection, adhesive, or other attachment means known in the art. Alternatively, as in the depicted embodiment, top cap 106 can be integrally molded with central post 107 so as to be integrally formed as a single unitary member of the same piece of material. Thus, in some embodiments, the base 105, top cap 106, and central post 107 are all integrally formed as a single unitary member of the same piece of material.

Base 105, top cap 106, and central post 107 are typically comprised of a rigid polymeric material. For example, in one embodiment, base 105, top cap 106, and central post 107 are injection molded from rigid ABS plastic. Other examples of conventional polymeric materials that can be used include polyethylene (including High Density Polyethylene (HDPE)), polyvinylchloride, nylon, polycarbonate, and polypropylene. Other materials can also be used.

Returning to FIG. 2 in conjunction with FIG. 1, cover 104 comprises a top surface 180 and an opposing bottom surface 182 that extend radially outward from an inner edge 184 to a perimeter outer edge 186. As discussed below, cover 104 is configured such that when cover 104 is attached to main body 102, cover 104 is movable with respect to main body 102 between a closed position and an open position, shown respectively in FIGS. 2 and 3. In general, in the open position, the cover 104 is inverted from the closed position. In either of these positions, cover 104 is substantially dome shaped such that the cross sectional shape of both top and bottom surfaces 180 and 182 curve as the surfaces radially extend from inner edge 184 to outer edge 186, as shown in FIGS. 2 and 3.

Formed circumferentially along the outer edge 186 of cover 104 is an outer lip 188. Outer lip 188 has a substantially curved cross sectional shape, although other shapes can alternatively be used. Outer lip 188 is configured to rest against groove 116 of base 105 so that a portion of outer lip 188 is received therein.

Figure 3:
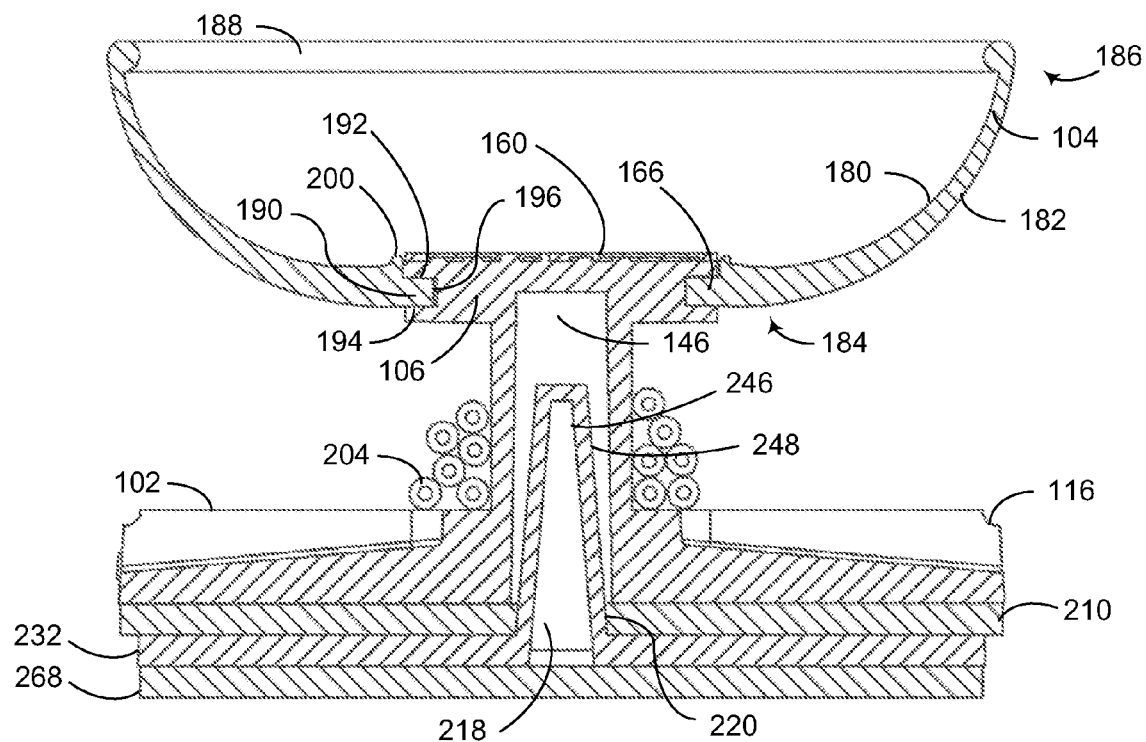
FIG. 3 is a cross-sectional side view of the cable coiling apparatus shown in FIG. 1 mounted on a rack, with the cover of the cable coiling apparatus in the open position and a cable positioned therein.

Turning to FIG. 3, projecting inward from inner edge 184 is an inner lip 190 having a top surface 192, an opposing bottom surface 194, and an inner side surface 196 extending therebetween. In some embodiments the top surface 192 of inner lip 190 aligns with top surface 180. Similarly, in some embodiments the bottom surface 194 of inner lip 190 aligns with bottom surface 182. Inner lip 190 bounds an aperture 198 (see FIG. 1) that extends completely through cover 104. Aperture 198 is sized so that inner lip 190 can be securely received within channel 166 of top cap 106. As such, in the depicted embodiment aperture 190 is substantially circular so as to match the circular shape of top cap 106. In those embodiments where top cap 106 is not circular, aperture 198 is sized and shaped to match the non-circular shape. In one embodiment, aperture 198 is smaller than the outer circumference of top cap 106.

As shown in FIGS. 2 and 3, cover 104 is positioned on top cap 106 so that inner lip 190 is received within channel 166 of top cap 106, thereby securing cover 104 to top cap 106. In one method of assembly, inner lip 190 is forced down over top cap 106 until inner lip 190 aligns with channel 166 and becomes positioned therein. During assembly, inner lip 190 can be easily manipulated into channel 166 due to the resilient material that makes up cover 104. In some embodiments, inner lip 190 is permanently secured within channel 166, such as by adhesive or other securing method. In other embodiments, inner lip 190 is not permanently secured within channel 166, but can be removed from top cap 106 if desired.

Extending up from cover 104 at inner edge 184 is a flange 200. Flange 200 can extend higher than top surface 160 of top cap 106 so as to protect the top surface 160 of top cap 106 during transport or use. In some embodiments, flange 200 is omitted.

As noted above, FIG. 2 shows the cable coiling apparatus 100 with the cover 104 positioned in the closed position. In this closed position, bottom surface 182 of cover 104 is positioned on the inside of the formed dome and top surface 180 is positioned on the outside of the formed dome. The cover 104 curves downward from top cap 106 to top surface 108 of base 105 such that outer lip 188 is received in groove 116 of base 105. As a result, when cover 104 is in the closed position shown in FIG. 2, bottom surface 182 of cover 104 and top surface 108 of base 105 of main body 102 together bound an enclosed chamber 202. In this closed position, mouths 128 formed on perimeter side wall 112 of base 105 are positioned below the outer edge 186 of cover 104 (see, e.g., cable coiling apparatus 100a shown on FIG. 5). As a result, when cover 104 is in the closed position, channels 118 formed on base 105 act as ports into chamber 202.

As noted above, cover 104 can be moved from the closed position shown in FIG. 2 to the inverted open position shown in FIG. 3. This is done by lifting the outer edge 186 of cover 104 vertically until the dome formed by cover 104 is upwardly inverted. In this position, the cover 104 is domed in the opposite direction as that shown in FIG. 2. That is, when in the open position, the top surface 180 of cover 104 is positioned on the inside of the upwardly formed dome and bottom surface 182 is positioned on the outside of the upwardly formed dome.

As shown in FIG. 3, when cover 104 is in this open position, top surface 108 of base 105 and central post 107 are freely exposed. In this position cable coiling apparatus 100 can be used as a spool to wind cables 204 onto, as discussed below.

Cover 104 is typically comprised of a resilient polymeric or rubber material. For example, in one embodiment, cover 104 is injection molded from a flexible TPE plastic. Other materials can also be used. Cover 104 has a sufficient wall thinness to allow the dome formed by cover 104 to be easily inverted to its open position and of sufficient thickness to allow the cover 104 to maintain its shape when in the closed and open positions.

Returning to FIG. 1, in some embodiments, cable coiling apparatus 100 further comprises a pad 210 attached to bottom surface 110 of base 105. As shown in FIG. 2, pad 210 comprises a thin member having a top surface 212 and an opposing bottom surface 214 with a perimeter side surface 216 extending therebetween. Formed centrally within pad 210 is an aperture 218 that extends completely through pad 210 between top and bottom surfaces 212 and 214. Aperture 218 is bounded by an encircling inner wall 220 that extends between top and bottom surfaces 212 and 214.

Pad 210 is sized so as to fit onto bottom surface 110 of base 105. As such, pad 210 is generally circular, having a diameter that is generally the same as or smaller than base 105. If base 105 is non-circular, pad 210 is also generally non-circular, generally matching the shape of base 105. Aperture 218 is positioned on pad 210 so as to be aligned with aperture 140 formed on bottom surface 110 of base 105 when pad 210 is attached to bottom surface 110. As such, aperture 218 is positioned at mouth 148 of mounting passageway 146. Aperture 218 has a diameter that is generally less than or equal to the diameter of aperture 140 so as to be able to provide a friction fit with a rack 230 (FIG. 3), discussed in more detail below.

Pad 210 is typically comprised of a non-skid type of material. For example, pad 210 can be made of foam, rubber, polymeric or other material. Pad 210 can be attached to bottom surface 110 by adhesive or other means of attachment known in the art.

To load a cable onto cable coiling apparatus 100, the user moves the cover 104 to the open position if cover 104 is not already there. To do this, the user lifts up on the perimeter outer edge 186 of the cover 104 separating it from the base 105 of main body 102 and inverting the cover 104 to its open position, as shown in FIG. 3. Once the cover 104 is in the open position, the user wraps a cable 204 around the central post 107 of the main body 102.

For ease of use, connectors or non-connector devices positioned at either end of the cable 204 can be positioned further away from central post 107 so as to be easily accessible. Connectors can include, e.g., male or female electrical connectors, such as USB connectors, RCA style connectors, PS2 style connectors, or the like. Other connectors can also be used. The non-connector devices can include, e.g., earplugs, ear buds, bare wires projecting from the end of cable 204, or the like. Other non-connector devices can also be used.

After the cable 204 is wound around the central post 107, the user presses down on the perimeter outer edge 186 of the inverted dome cover 104 which causes the cover 104 to snap back to its original shape (i.e., the closed position shown in FIG. 2), holding the cable 204 firmly and neatly within. The connectors or other devices at the ends of the cable or cord can also be positioned completely within the chamber 202 formed within closed cable coiling apparatus 100.

To use the cable 204, the user again moves the cover 104 to the open position, as described above, and then unwinds a desired length of cable 204. The user then closes the cover, as described above, making sure that the portion of cable 204 exiting the cable coiling apparatus 100 is positioned in channels 118 so as to exit the cable coiling apparatus 100 through the mouths 128 formed on the sidewall 112.

When done using the cable 204, the cable 204 is easily and quickly re-wound on the central post 107 as described above and the cable coiling apparatus 100 can be placed in the user's pocket or briefcase or the like where cable coiling apparatus 100 can be readily accessed and used the next time it is needed. By using multiple cable coiling apparatuses 100, many cables 204 can be employed without tangling and the cables 204 can be stored efficiently and without confusion. In addition, each cable coiling apparatus 100 can be color coded based on the size or type of cable 204 contained therein to aid in determining which cable 204 should be used.

In one embodiment, the closed cable coiling apparatus 100 has the appearance of a palm-sized disc with a flat, solid base and a shallow, dome-shaped top. In the closed position, the cable coiling apparatus 100 provides a compact spooling container for the entire cable for transport or storage. When the connector cable is in use, both ends of the cable can be accessed and removed from the "spool" by means of egress through the channels 118. Excess cable can remain neatly contained in the closed "spool." Other sizes can alternatively be used based on the size and type of cable used. For example, if cable coiling apparatus 100 is to be used with a long electrical extension cord, cable coiling apparatus 100 can be sized larger to match. Similarly, if cable coiling apparatus 100 is to be used with a very small gauge wire, cable coiling apparatus 100 can be sized smaller to match.

Figure 5:
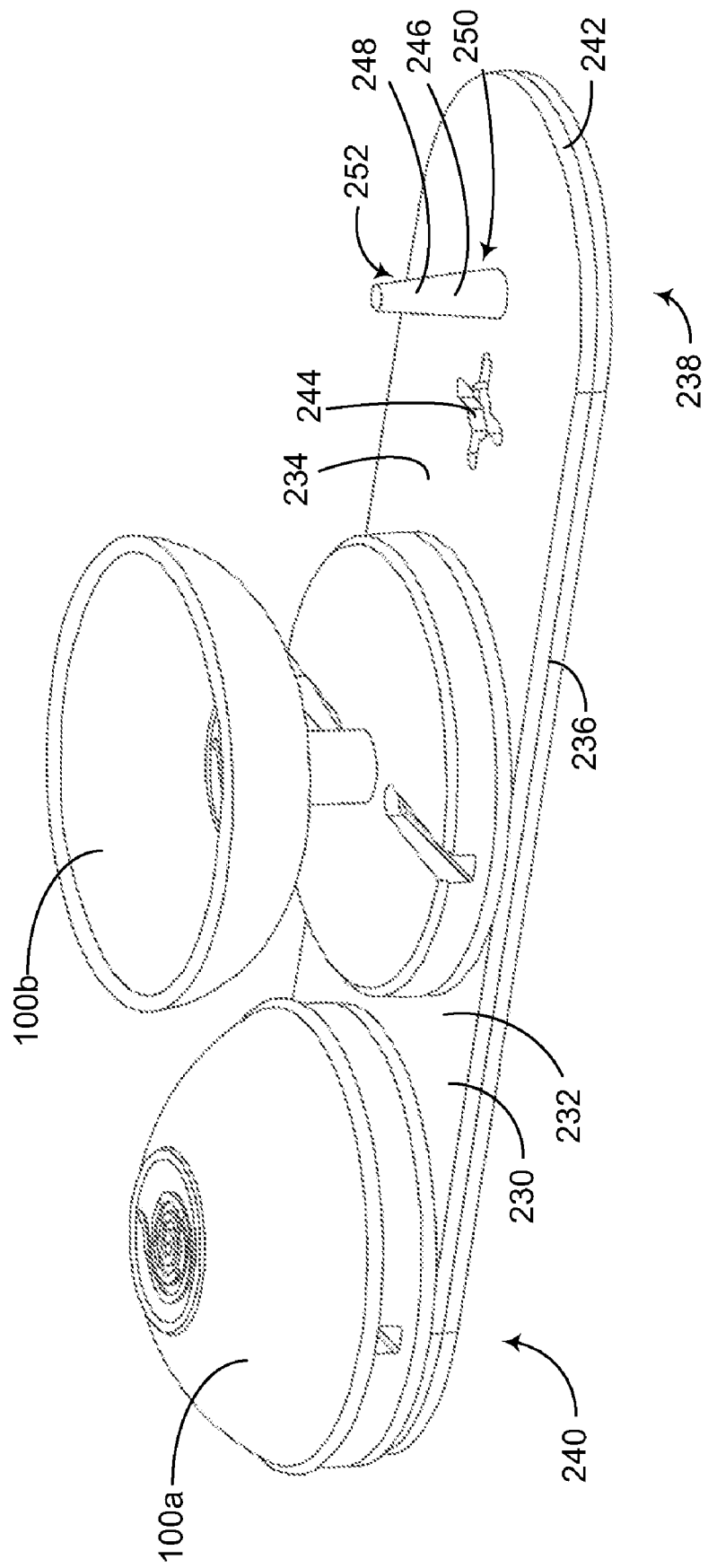
FIG. 5 is a top perspective view of a rack with a couple of cable coiling apparatuses mounted thereon.

Turning to FIG. 5, a rack 230 is disclosed on which one or more cable coiling apparatuses 100 can be removably mounted. For example, in the depicted embodiment, rack 230 has a cable coiling apparatus 100a in the closed position and a cable coiling apparatus 100b in the open position mounted thereon.

Rack 230 comprises a base 232 having a top surface 234 and an opposing bottom surface 236, extending between a first end 238 and a second end 240 with a perimeter side surface 242 extending therebetween. Rack 230 is designed to be positioned horizontally on a level surface, such as a desk or table, or to be mounted vertically, such as on a wall. To facilitate vertical mounting, one or more screw holes 244, as are known in the art, are formed in base 232. In some embodiments, such as those in which rack 230 is not to be vertically mounted, screw holes 244 can be omitted.

Top surface 234 is substantially planar so as to allow cable coiling apparatuses 100 to easily mount thereon. To aid in mounting cable coiling apparatuses 100 to rack 230, one or more attachment members 246 are formed or project upward from top surface 234 of base 232. Each attachment member 246 is configured to correspond to a separate cable coiling apparatus 100. For example, the depicted embodiment includes three attachment members 246 so that three cable coiling apparatuses 100 can be mounted onto rack 230. In the depicted embodiment, only one attachment member 246 is shown, as the other two are covered by cable coiling apparatuses 100a and 100b, which are already mounted thereon.

In the depicted embodiment, attachment members 246 comprise mounting posts each having an exterior surface 248 extending from a first end 250 disposed on top surface 234 to a spaced apart second end 252. Mounting posts 246 can be attached to top surface 234, such as by threaded connection, press fit connection, adhesive, or the like. Alternatively, mounting posts 246 can be integrally formed or molded with top surface 234. Each mounting post 246 is substantially cylindrically shaped, with the second end 252 having a smaller diameter than first end 250, if desired. Each mounting post 246 is sized so as to be able to be received within mounting passageway 146 of cable coiling apparatus 100. Specifically, the diameter at the first end 250 of mounting post 246 is sized so as to be less than or equal to the diameter of the mouth 148 of mounting passageway 146.

To mount cable coiling apparatus 100 onto rack 230, cable coiling apparatus 100 is positioned so that mounting passageway 146 of main body 102 is aligned with mounting post 246 of rack 230. Then cable coiling apparatus 100 is pushed toward rack 230 so that mounting post 246 enters mounting passageway 146, as shown in FIG. 3. To dismount cable coiling apparatus 100 from rack 230, the cable coiling apparatus 100 is simply lifted off mounting post 246.

Pad 210 can be used to provide a more secure mounting for conditions where that is needed, e.g., when rack 230 is vertically mounted, or where rack 230 may be exposed to moving conditions, such as in a moving vehicle. As noted above, when pad 210 is used, aperture 218 is aligned with mounting passageway 146 and is sized to be less than or equal to the diameter of mounting post 246. As a result, when pad 210 is used and mounting post 246 is inserted into mounting passageway 146, the inner wall 220 of pad 210 bounding aperture 218 presses inward on the exterior surface 248 of mounting post 246. This creates a friction fit that prevents cable coiling apparatus 100 from dislodging from mounting post 230 when mounted thereon.

Mounting posts 246 are only one type of attachment member that can be used with the present invention. Alternatively, hooks, releasable fasteners, or any other known attachment mechanisms can be used.

Bottom surface 236 of base 232 can be a solid surface, similar to top surface 234, or can comprise the bottom surfaces of a plurality of elements. For example, in the embodiment depicted in FIG. 6, a plurality of ribs 260 are formed that extend along perimeter side surface 242 and between different portions of perimeter side surface 242. Each rib 260 has a bottom edge surface 262 facing away from base 232. The bottom edge surfaces 262 are configured to collectively rest on a flat surface. As such, the bottom edge surfaces 262 collectively combine to form the bottom surface 236 of base 232.

Figure 6:
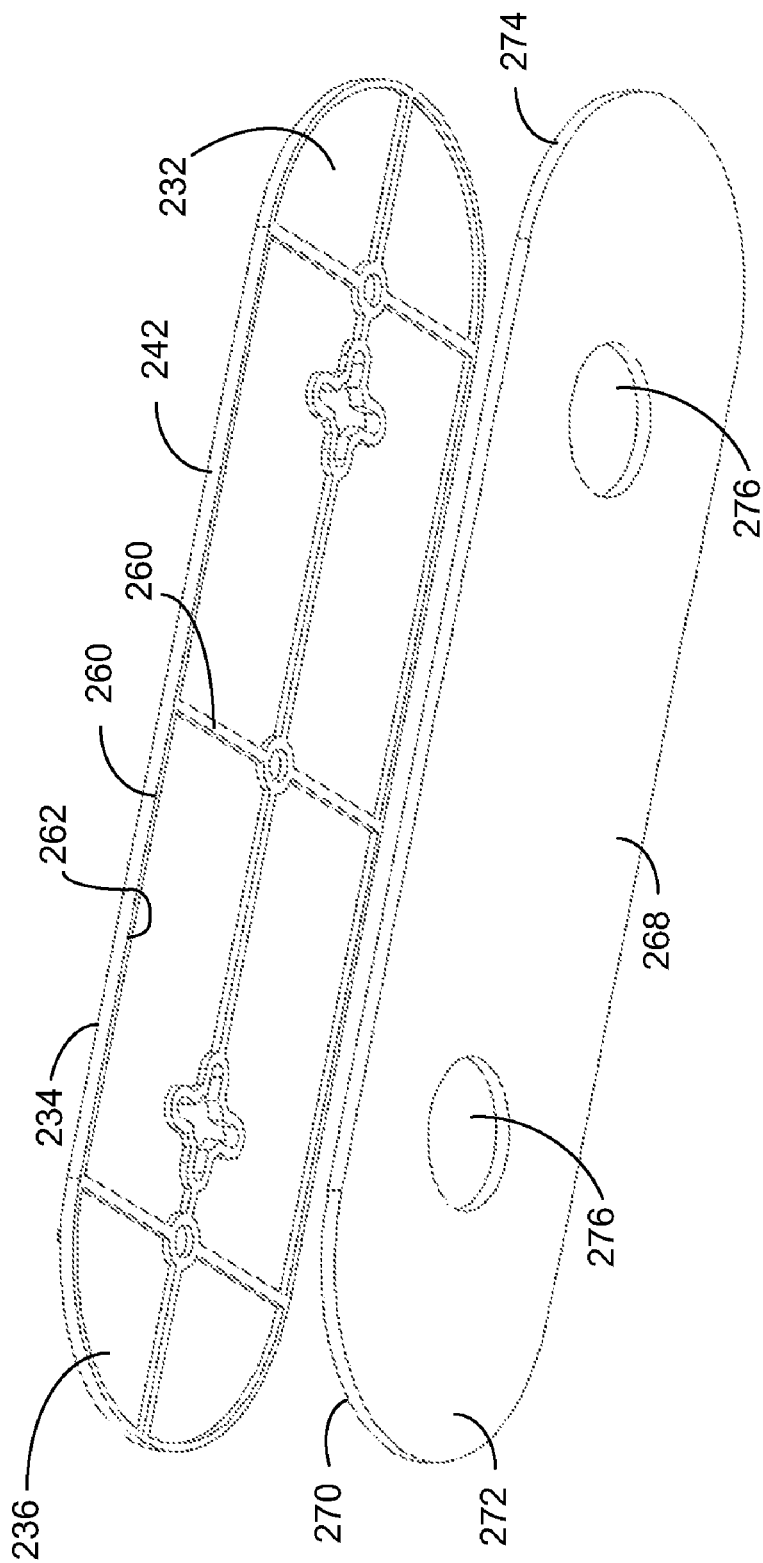
FIG. 6 is an exploded bottom perspective view of the rack shown in FIG. 5.

In some embodiments, rack 230 further comprises a pad 268 attached to bottom surface 236 of base 232. As shown in FIG. 6, pad 268 comprises a thin member having a top surface 270 and an opposing bottom surface 272 with a perimeter side surface 274 extending therebetween. If screw holes 244 are used, one or more apertures 276 can be formed within pad 268 that align with screw holes 244. Apertures 276 are formed so as to extend completely through pad 268 between top and bottom surfaces 270 and 272. Apertures 276 will allow screws to pass therethrough so as to be received within screw holes 244.

Pad 268 can be comprised of the same types of materials as pad 210. Pad 268 can be attached to bottom surface 110 by adhesive or other means of attachment known in the art.

The inventive cable coiling apparatus according to the present invention can be used for various types of cables and cords. For example, speaker wires, extension cords, telephone wires, computer wires, component connecting cables, headphone wires, ear bud wires and the like can all be accommodated by various embodiments of the present invention. Other cables, wires, and cords can also be accommodated.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A coiling apparatus, comprising:
    a main body comprising:
        a base having a top surface and an opposing bottom surface with a perimeter side surface extending therebetween;
        a top cap having a perimeter channel formed thereon; and
        a central post extending from the top surface of the base to the top cap; and
    a resilient cover comprising:
        a top surface and an opposing bottom surface extending radially between an inner edge and a perimeter outer edge; and
        an inner lip projecting from the inner edge, the inner lip bounding an aperture extending completely through the cover, the inner lip being received within the channel of the top cap so as to secure the cover to the top cap, the cover being movable between a first position in which the inner surface of the cover has a substantially concave shape so that the cover presses against the base, and an inverted second position in which the inner surface of the cover has a substantially convex shape so that the central post is freely exposed.

2. The coiling apparatus as recited in claim 1, wherein the cover further comprises an outer lip formed along the perimeter outer edge, the outer lip pressing against the base when the cover is in the first position.

3. The coiling apparatus as recited in claim 2, wherein a groove is formed between the top surface of the base and the perimeter side surface of the base, the outer lip of the cover being received within the groove when the cover is in the first position.

4. The coiling apparatus as recited in claim 1, wherein a channel is formed on the top surface of the base that extends through the side surface of the base.

5. The coiling apparatus as recited in claim 4, wherein the channel does not extend through the bottom surface of the base.

6. The coiling apparatus as recited in claim 1, wherein the cover and the base bound an enclosed chamber when the cover is in the first position, and wherein a channel is formed on the top surface of the base that extends through a mouth formed on the side surface of the base, the mouth acting as a port into the chamber.

7. The coiling apparatus as recited in claim 1, further comprising a non-skid pad positioned on the bottom surface of the base.

8. The coiling apparatus as recited in claim 1, wherein the cover is substantially dome shaped.

9. The coiling apparatus as recited in claim 1, wherein the base and cover are both substantially circular.

10. The coiling apparatus as recited in claim 1, wherein the perimeter channel extends along the entire perimeter of the top cap.

11. A method, comprising:
    moving a cover of a cable coiling apparatus:
        from a closed position, in which an outer lip formed at a perimeter outer edge of the cover presses against a groove formed in a main body of the cable coiling apparatus to bound an enclosed chamber having a post positioned therein,
        to an open position, in which the cover is inverted so as to expose the post, the cover having an inner edge being received within a channel formed on a top cap of the main body;
    winding a cable around the post; and
    moving the cover from the open position to the closed position to again bound the enclosed chamber, the cable being positioned completely within the enclosed chamber.

12. The method as recited in claim 11, further comprising:
    moving the cover from the closed position to the open position after the cable has been wound around the post;
    unwinding a portion of the cable from the post; and
    moving the cover from the open position to the closed position to again bound the enclosed chamber, the unwound portion of the cable exiting the chamber via a mouth formed on a side surface of the main body.

13. The method as recited in claim 11, wherein the cable extends between a first end and a spaced apart second end, and the method further comprises:
    moving the cover from the closed position to the open position after the cable has been wound around the post;
    unwinding two portions of the cable from the post, the two portions respectively including the first and second ends of the cable; and
    moving the cover from the open position to the closed position to again bound the enclosed chamber, the unwound portions of the cable exiting the chamber via separate mouths formed on a side surface of the main body so that the first and second ends of the cable are positioned outside of the cable coiling apparatus.

14. The method as recited in claim 11, further comprising:
    mounting the cable coiling apparatus on a rack.

15. The method as recited in claim 14, wherein mounting the cable coiling apparatus on a rack comprises:
    aligning a mounting passageway of the main body with a mounting post of the rack; and
    pushing the cable coiling apparatus toward the rack so that the mounting post is received within the mounting passageway such that a pad mounted on the cable coiling apparatus presses against the mounting post of the rack, providing a friction fit therebetween.

\* \* \* \* \*